United States Patent [19]
Goodman, Jr. et al.

[11] 3,834,565
[45] Sept. 10, 1974

[54] HYDRAULIC LOADING RAMP

[75] Inventors: Roy S. Goodman, Jr.; Dee Maryon Kirk; Harvey D. Kirk, all of Denison, Tex.

[73] Assignee: R. S. Goodman Company, Denison, Tex.

[22] Filed: June 4, 1973

[21] Appl. No.: 366,990

Related U.S. Application Data

[63] Continuation of Ser. No. 165,123, July 22, 1971, abandoned.

[52] U.S. Cl. .................................... 214/85, 296/61
[51] Int. Cl. ............................................ B65g 67/02
[58] Field of Search .............. 214/85, 85.1; 296/61; 14/71, 72

[56] References Cited
UNITED STATES PATENTS
3,516,560   6/1970   Brighton .............................. 214/85
3,580,404   5/1971   Moser .................................. 214/85

Primary Examiner—Albert J. Makay
Attorney, Agent, or Firm—Pravel, Wilson & Matthews

[57] ABSTRACT

A rectractable runway is pivotally connected to the load bed of a trailer and is extendible to the ground or other load area so that materials including heavy construction equipment, can be moved therebetween.

1 Claim, 3 Drawing Figures

PATENTED SEP 10 1974 3,834,565
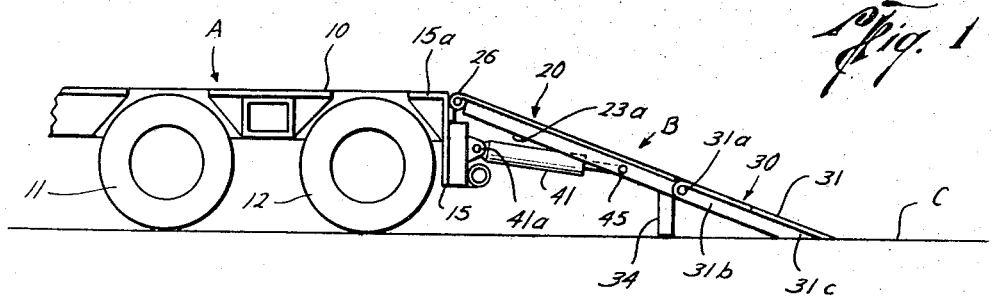
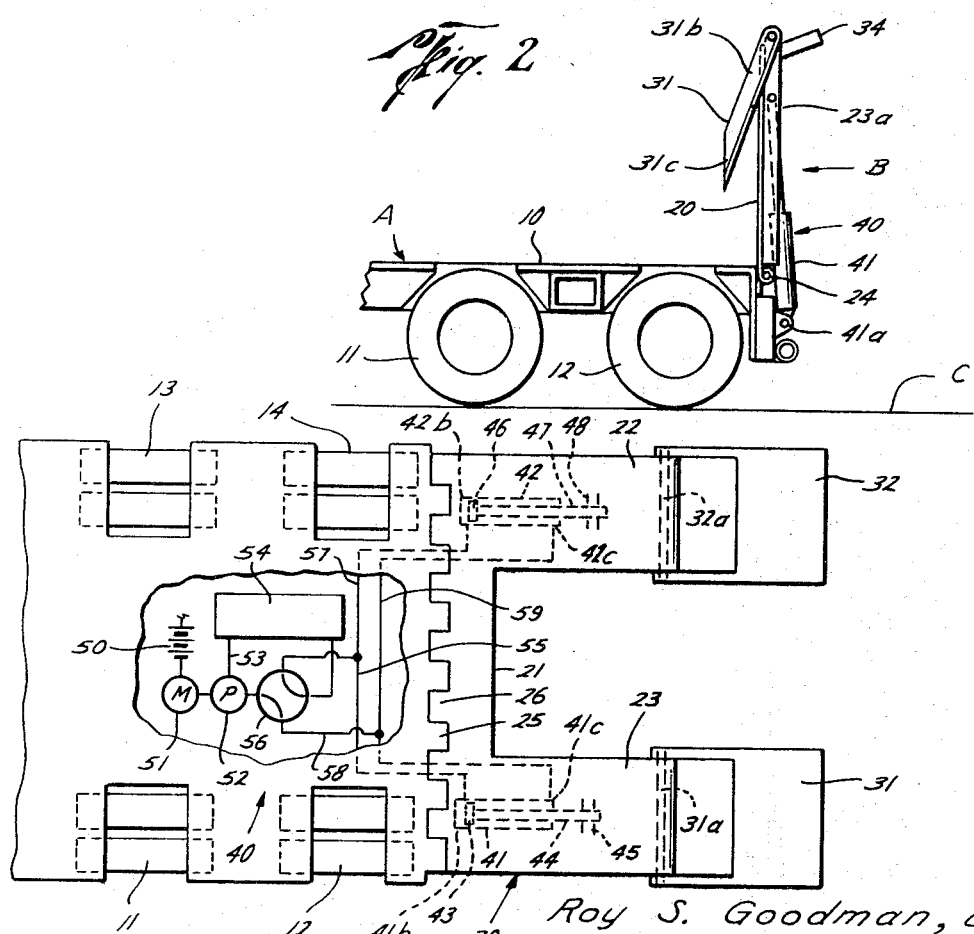
Roy S. Goodman, Jr.
Dee M. Kirk
Harvey D. Kirk
INVENTORS
BY
Pravel Wilson & Matthews
ATTORNEYS

HYDRAULIC LOADING RAMP

CROSS-REFERENCE TO RELATED APPLICATIONS

The present application is a continuation of our prior U.S. Pat. application, Ser. No. 165,123, filed July 22, 1971, co-pending herewith, and now abandoned.

BACKGROUND OF THE INVENTION

The field of this invention is runways or ramps which provide for the loading and unloading of materials.

A problem often encountered when carrying materials by truck trailer is the lack of dependable runways or ramps at the various sites where the materials are loaded and unloaded. For example, flatbed trucks are used quite often to carry heavy construction equipment, such as tractors, between jobs. At the loading and unloading points, a runway must be provided between the load bed of the truck trailer and the ground so that the tractors can be driven onto and off of the truck trailer. Since runways strong enough to support such heavy loads as tractors are not readily available, the truck trailer must provide its own ramp or runway.

A runway sufficiently strong to support a trailer must be constructed of very heavy steel; therefore, it must be mounted on the truck and movable into position by some type of power means because it is too heavy to be moved manually without undue effort. Even though mounted on the truck trailer, such a runway should not take up any of the load carrying space in the load bed of the truck trailer. In U.S. Pat. No. 2,966,274, issued to Price, a ramp is pivotally mounted on the end of inclined extensions of a truck trailer load bed, called "beaver tails", and is foldable to a horizontal position. However, the surface of the folded ramp cannot be used for loading since the ramp must be raised from its horizontal position before it is usable. Further, the necessity of using the beaver tails adds unnecessary length to the trailer.

SUMMARY OF THE INVENTION

It is an object of this invention to provide a new and improved retractable runway.

This and other objects are accomplished by providing a runway that includes first ramps pivotally mounted on the back of the load bed of a trailer truck. Second ramps are pivotally attached to the first set of ramps and are aligned with the first ramps to receive wheeled vehicles. When both the first and second ramps are in an extended position, they cooperate to provide a continuous runway whereby such equipment as tractors may be moved between the load bed of the truck trailer and the ground.

BRIEF DESCRIPTION OF THE DRAWING

The preferred embodiment of this invention will be described hereinafter, together with other features thereof, and additional objects which will become evident from such description.

The invention will be more readily understood from a reading of the following specification and by reference to the accompanying drawings forming a part thereof wherein one or more embodiments of the invention are shown and wherein:

FIG. 1 is an elevational view of the runway, according to a preferred embodiment of this invention, in an extended position, showing only a portion of the truck trailer;

FIG. 2 is an elevational view of the runway in a retracted position; and

FIG. 3 is a top view of the runway with a portion of the load bed of the truck trailer removed to illustrate the hydraulic system of this invention.

DESCRIPTION OF THE PREFERRED EMBODIMENT

In the drawing, the letter A designates a typical truck trailer and the letter B generally designates a new and improved retractable runway extendible from the trailer to ground C. The truck trailer A includes a load carrying bed 10 which is supported on sets of wheels 11, 12, 13 and 14 and concomitant axle systems (not shown). An L-shaped rear support wall 15, which may be made of a heavy guage plate steel, is attached to the rear load carrying bed 10 in order to provide a mounting support for the retractable runway B.

The retractable runway B, according to a preferred embodiment of this invention, is illustrated in FIG. 1 in an extended position providing a continuous runway from the bed 10 of the trailer A to the ground C; and, in FIG. 2 it is illustrated in a retracted position where it is disposed substantially perpendicular to the load bed 10.

The retractable runway B includes a first U-shaped platform 20 having a base section 21 with two side ramps 22 and 23 extending therefrom. The first platform 20 is pivotally mounted on the support plate 15 by means of a shaft 24 which extends through a plurality of sleeves 25 and 26 extending from a portion 15a of the rear support wall 15 and from the base section 21 of the U-shaped first platform, respectively.

A second platform means, generally designated as 30, comprises two individual ramp portions 31 and 32 which are pivotally connected to the side ramps 23 and 22, respectively, by means of shafts 31a and 32a. Support members or studs such as 34 are attached to undersides, such as 31b, of each of the ramps 31 and 32 in order to engage the ground C and provide support for both the U-shaped platform 21 and the ramps 31 and 32 in their extended position as shown in FIG. 1.

A hydraulic system 40 provides the means for moving the first and second platforms 20 and 30, respectively, between the retracted position illustrated in FIG. 2, where the first platform 20 is generally perpendicular to the load bed 10, and a second position illustrated in FIG. 1 where a continuous runway is provided. The hydraulic system 40 includes hydraulic cylinders 41 and 42 which are pivotally mounted to the support base plate 15 by the pivotal connection such as 41a. A piston 43, with a piston rod 44 connected thereto, is slidably, sealably mounted for slidable movement within the cylinder 41, the piston rod 44 being pivotally attached at 45 to the underside 23a of the side ramp 23. Similarly, a piston 46 is slidably, sealably mounted for slidable movement within the cylinder 42 and the piston is attached to a piston rod 47, which is pivotally mounted at 48 to the underside of the side ramp 22 (shown in broken lines in FIG. 3).

Hydraulic fluid under pressure is provided by a hydraulic power system which includes a battery 50 providing electric power for a reversible motor 51. The reversible motor 51, which may be a truck engine starter motor, is connected to a gear type hydraulic pump 52 by two different sets of gears (not shown) so that hydraulic fluid may be pumped in two directions. Extending from the hydraulic pump 52 is a hydraulic line 53, which is connected to a reserve 54 for hydraulic fluid.

Another hydraulic line 55 extends from the hydraulic tank 54 and through a two-line valve 56 into a hydraulic line 57, which is connected into sides 41b and 42b of both the hydraulic cylinders 41 and 42 (shown in broken lines in FIG. 3).

Another hydraulic line 58 also extends from the hydraulic pump 52 through the two-line valve 56, but it is connected to a hydraulic line 59 which extends into the other sides 41c and 42c of the hydraulic cylinders 41 and 42. Of course, as is well known in the art, by using such a hydraulic system as described herein, the piston rods 44 and 47 may be extended and retracted, with respect to the hydraulic cylinders, by controlling the entry of hydraulic fluid under pressure into either hydraulic line 57 or hydraulic line 59, respectively.

When the continuous runway B is not in actual use, it is pivoted to the position shown in FIG. 2 by applying hydraulic pressure under fluid through line 57, which causes the piston rods 44 and 47 to extend thereby moving the first platform 20 to the position shown in FIG. 2 where it is substantially perpendicular to the load bed 10 of the trailer. In the retracted position shown in FIG. 2, the pivotally mounted ramps 31 and 32 are pivoted to a withdrawn position so that the profile of the runway will be lower. In the retracted position shown in FIG. 2 it is noted that one of the significant advantages of the runway according to the preferred embodiment of this invention is that none of the load storage space on the load bed 10 of the trailer is consumed with the runway, itself. This allows for the maximum loading of materials or tractors onto the load bed.

When it is desired to unload materials such as tractors or other construction equipment, hydraulic fluid is applied under pressure through hydraulic line 59 thereby causing the piston rods to retract so that the first platform is rotated downward from the position in FIG. 2 to the position in FIG. 1 where the first platform 20 extends toward the ground. After the first platform has been position by the hydraulic means, an operator may unfold the ramps 31 and 32 to the extended position shown in FIG. 1 where the support member 34 engages the ground, as does the tapered ends of the ramps, such as end 31c of ramp 31. With the runway in the position of FIG. 1, the side ramps 22 and 23 are aligned with the pivotally mounted ramps 31 and 32 so that wheeled vehicles such as tractors can be moved between the load bed 10 of the trailer A and ground C.

By way of specific example, the hydraulic cylinders 41 and 42 used to raise and lower the ramps have a two inch inner diameter and the sealed mounting of the pistons 43 and 46 within the cylinders 41 and 42 are capable of withstanding pressures of approximately 2,500 p.s.i. The storage tank is a two gallon tank storing hydraulic oil and all the lines are typical hydraulic hoses also able to withstand the above mentioned pressures. The length of the cylinder and piston and rod combinations are 22 inches in the retracted position and 34 inches in the extended position. The overall length of the ramp is 99 inches in its extended position, the length of the side ramps 22 and 23 of the first platform 20 being 63 inches and the length of the pivotally mounted ramps 31 and 32 being 36 inches. It is understood that these examples of specific dimensions are given by way of illustration and that it is within the scope of this invention to adapt this retractable runway not only to different sizes of truck trailers A but also to load areas other than the ground C.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

We claim:

1. A retractable runway extendable between first and second load areas so that materials are moved therebetween, comprising:

a. said first load area being the bed of a truck trailer;

b. a first platform including a first pair of first spaced side ramps integrally connected by a transversely extending base portion, said base portion being pivotally connected to said truck trailer;

c. a second platform pivotally connected with said first platform, said second platform including spaced, second side ramps pivotally connected with said first side ramps opposite said base portion and aligned with said first spaced side ramps;

d. said first and second spaced side ramps being movable between and extended position, to permit movement of materials between said first and second load areas, and a retracted position;

e. support members extending downwardly from said second pair of spaced side ramps to support said first and second platforms in the extended position;

f. said first side ramps being positioned approximately perpendicular to said truck trailer in said retracted position;

g. said second ramps having forward openings formed therein permitting forward pivotal movement thereof with respect to said first ramps so that said trailer bed second ramps are folded to a substantially withdrawn downward position overlying the inside of said first side ramps in said retracted position; and h. hydraulic motor means for moving said first and second spaced side ramps between the extended position and the retracted position, said hydraulic motor means including:

1. a motor;
      2. a hydraulic pump driven by said motor;
      3. double acting hydraulic cylinders pivotally attached to the truck trailer and in fluid connection with said hydraulic pump; and
      4. pistons, with piston rods connected thereto, sealably mounted in said hydraulic cylinders, said piston rods being pivotally attached to said first side ramps whereby hydraulic fluid entering said cylinders causes movement of said first side ramps.

* * * * *